Aug. 11, 1964    J. S. FORRESTER ETAL    3,144,559
CELL MEANS FOR SOFT X-RAY SOURCE
Filed Sept. 8, 1960    2 Sheets-Sheet 1

John Stanley Forrester
Francis Xavier Mayer     Inventors

By *Richard H. Nagel*    Attorney

John Stanley Forrester
Francis Xavier Mayer   Inventors

By Richard W. Nagel

Patent Attorney

United States Patent Office 3,144,559
Patented Aug. 11, 1964

3,144,559
CELL MEANS FOR SOFT X-RAY SOURCE
John Stanley Forrester and Francis Xavier Mayer, Baton Rouge, La., assignors to Esso Research and Engineering Company, a corporation of Delaware
Filed Sept. 8, 1960, Ser. No. 54,728
1 Claim. (Cl. 250—106)

The present invention relates to a method and apparatus for monitoring plant streams by X-ray radiation. More particularly, the present invention relates to a novel apparatus and means for rapidly determining quantitative information as to the halogen, oxygen or sulfur content in plant streams. In the preferred embodiments, the present invention relates to a novel control method for use in a Friedel-Crafts isomerization process, a hydrofining process and a butoxy production process. The method depends upon the absorption of substantially monochromatic X-ray radiation by the material under inspection and the apparatus furnishes a means for rapidly carrying out the plant monitoring function.

It has long been known that compounds absorb gamma radiation or X-rays to different extents. This phenomenon has been utilized to distinguish between different chemical elements to determine quantitatively the percentage of particular elements known to be present in a mixture. In the past, the apparatus used for determining the absorption consisted of an X-ray tube for generating a wide band of X-rays, which were thereafter separated into their various frequencies. Much complicated apparatus was required before this tool could be satisfactorily employed in analytical determinations.

A long step forward was taken when it was found that certain radioactive elements, in particular $Fe_{55}$, may be used as a source of radiation instead of conventional high voltage tubes. Basically, this process starts with a source of substantially monochromatic X-ray radiation that is radioactive in nature and of sufficient stability and strength. From the monochromatic source the radiation is passed through a sample of the material to be analyzed, which sample is of predetermined thickness. After passing through the sample, the remaining unabsorbed monochromatic radiation is impressed upon a Geiger counter which is connected through conventional scaling, time-differentiating, or count-rate device to an indicating or recording means. Since the source of X-ray radiation is substantially constant, the measurement of the X-ray radiation is a direct indication of the amount of absorption that has taken place under fixed conditions.

In plant analyses the situation often exists where the composition of the material under inspection is well-known except for the presence of some element or compound of a quite different nature from the bulk of the sample. Thus with naphtha hydrocarbons undergoing isomerization in the presence of a Friedel-Crafts catalyst, the material under inspection is composed almost entirely of hydrocarbons, except for halides present. The halides, having a quite different absorption characteristic from the hydrocarbons, have a pronounced effect upon the absorption of monochromatic X-ray radiation, and thus is a measure of the halide content of the hydrocarbon stream being measured. The instrument is placed in operation and calibrated by the use of samples of materials of the type that are to be analyzed but containing known percentages of the material in question.

Similar situations are present in a hydrofining process and the manufacture of butoxy resin. In the former the dissimilar constituent in the product streams, both liquid and gas, is sulfur. In the gas product the sulfur is generally in the form of $H_2S$ while in the liquid product it is generally in an unconverted form such as benzothiophenes, dibenzothiophenes, thiophenophenanthrenes, and sulfides. In the production of butoxy resin the dissimilar constituent in the product stream is oxygen. As will be more fully explained hereinafter the sulfur content and oxygen content of the respective streams may be measured after proper calibration of the detector device.

It is the principal object of the present invention to set forth a novel apparatus for monitoring plant streams, particularly when the latter is operated under superatmospheric pressure, which is simply constructed and easily maintained.

It is a further object of the present invention to provide an improved method whereby the combined halide content in a naphtha stream may be quickly and continuously determined, and the aluminum bromide-catalyzed light naphtha isomerization process controlled thereby.

It is a further object of the present invention to provide an improved method whereby the sulfur content in the products stream of a hydrofining process may be quickly and continuously determined, and the hydrofining process controlled thereby.

It is still a further object of the present invention to provide an improved method whereby the oxygen content in a resin product stream may be quickly and continuously determined, and the resin production process controlled thereby.

Additional objects and advantages of the instant invention will be readily apparent from the more detailed discussion of the invention hereinafter.

Figure 1:
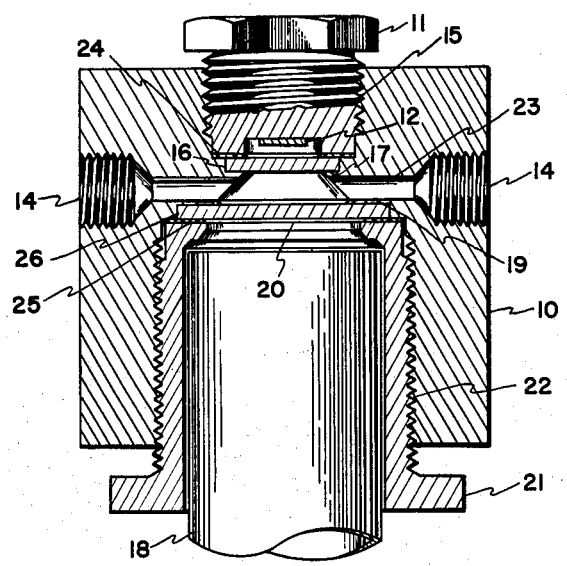
FIGURE 1 represents a schematic vertical cross-section of the apparatus of the instant invention for monitoring plant streams.

The preferred form of the device of the present invention is a cell block containing in unitized relationship the $Fe_{55}$ radiation source, the windows, and Geiger tube detector. The relationship of these parts, and their function, is made more clear below.

Cell block 10 is preferably fabricated from stainless steel, Monel or other suitable corrosion resistant material. Conveniently it may be a cube 3" on a side. Cell block 10 has a passageway 23 extending therethrough which is adapted to receive and discharge a continuous flow of fluid. Threaded entrance and exit connections 14 are adapted to receive pipe through which the sample to be analyzed passes.

In addition the cell block has two chambers which communicate with passageway 23. The upper chamber illustrated in the drawing has a wall adapted at 15, by threads, etc., to engage means 11 which supports a source of monochromatic X-ray radiation 12. The source of monochromatic X-ray radiation 12, which may be $Fe_{55}$, is mounted on the end of stainless steel bolt 11. The $Fe_{55}$ or other suitable source of monochromatic X-ray may be plated on a small piece of platinum which is fastened to the end of bolt 11. The source may have a diameter of ⅜" or any other suitable size.

In addition there is located within the upper chamber a window 16 which is supported at 17 by the wall of the upper chamber. Means 11 further supports the window 16 in the upper chamber. A suitable gasket 24 may be placed between the means 11 and window 16 for sealing purposes and to prevent contact of the bolt with the window.

Directing attention to the lower chamber shown in the drawing it will be seen to have a wall adapted at 22 to engage means 21 for positioning a radiation detecting means 18 in this chamber. The wall of this chamber is further adapted at 19 to provide support for a window 26 which is additionally supported by means 21. A gasket 25 may be placed between means 21 and window 26 for sealing purposes and to prevent contact of the bolt with the window. Geiger tube 18 is positioned by means 21 in the cell block 10 to be as close to window 26 as possible. The opening 20 in means 21 is equal in size to the opening of the Geiger tube windows. The radiation detecting mechanism consists of a Geiger counter tube assembly 18 of conventional design, i.e., a tube plus electronic scaler, and this assembly extends in a direction parallel to the radiation. Any commercial detecting mechanism, such as a "Tracer-lab" type TGC–3 is suitable. The cell windows 16 and 26 between which the fluid sample flows are spaced a distance depending on the approximate concentration of the variable in the stream to be analyzed. The spacing is further a function of the type and concentration of the material to be measured. For optimum conditions, i.e. for maximum precision, the ratio of the transmission of the sample to the transmission of a hydrocarbon without material under analysis should be in the range of about 20 to 80%.

It has further been found that for analysis of streams under pressure, windows made of beryllium give outstanding results. Because of the relatively low soft X-ray cross-section of beryllium metal, these windows may have a thickness up to 1 mm., though preferred are thicknesses of 0.2 to 0.5 mm. In general, the lower the cross-sectional area of the window the thinner the window may be designed for a given pressure. From this it follows the thinner the window the lower the energy loss of the X-ray beam in passing through the window. By maintaining the distance of the radiation source to the sample short, of the order of $\frac{1}{4}''$ to $\frac{1}{2}''$, sufficient strength is provided to withstand pressures up to 1000 p.s.i.g. It is an important element of the present invention to maintain the source-to-detector distance at a minimum.

The purpose of the novel cell design enunciated above is (1) to withstand the unit pressure, and (2) to keep energy losses occurring between the source and the detector to a minimum and (3) to provide a device which may be easily and economically constructed and maintained. In this way a sufficiently high count rate can be obtained in spite of the necessity of increasing the cell window thickness to withstand the pressure. By "sufficiently high count rate" is meant the collection of a statistically significant number of counts to permit observations to be made in a reasonable length of time.

The following calculation makes clear that the unitized design of radiation source, cell and detector of the present invention serves to minimize the energy loss encountered by the X-ray beam in passing through the beryllium.

|  | Percent |
|---|---|
| Initial energy | 100 |
| Energy after passing through beryllium windows (0.1 cm. each) | 27 |
| Energy after passing through solvent (naphtha)— 0.79 cm. cell | 3.1 |
| Energy after correcting the cell geometry | 0.4 |

The detector "sees" only a fraction of this "envelope." The fraction it "sees" is:

$$\frac{\text{Area of window}}{\text{surface of radiation envelope}} = \frac{\pi (\text{radius of detector})^2}{4\pi (\text{distance of source to detector})^2}$$

From this equation it is evident that the intensity at the detector decreases as the square of the distance and increases as the square of Geiger tube radius exposed to the radiation.

The output of the detector is fed to an electronic scaler wherein the pulses reaching the tube are measured. The output is periodically presented physically by a printer. The printer numbers are directly related to the variable component in the plant stream being measured. As illustrated, it has been shown above that 99.6% of the radiation is absorbed by various factors before ever reaching the detector. In addition, there is a loss of $1/e$ due to the absorbing material in the sample cell and a loss from incomplete counting in the Geiger tube. Assuming there is employed a 4 millicurie $Fe_{55}$ source, this represents $1.5 \times 10^8$ disintegrations per second. Most of this radiation is lost and possibly only 1000 counts per second reach the detector. Two ways may be used to measure this count:

(1) For high counts (several thousands per second) a rate meter is coupled to a recorder. A solvent, e.g. naphtha, is periodically flushed through the sample cell and the ratio of the count of the sample to the count of the solvent is proportional to the unknown concentration.

(2) For low counts (less than about 1000 per second) the rate meter precision is poor. In that case the Geiger tube output is fed to a scaler which is coupled to a print-out timer which records the time necessary to reach a predetermined count, e.g. 5,000 counts. The ratio of time for the sample count to time for blank count is again a function of the unknown concentration.

The invention finds particular application in the liquid phase isomerization of normal hydrocarbons boiling in the light naphtha range, such as $C_5$, $C_6$ and $C_7$, to the corresponding high octane isomers. This process is advantageously carried out in the presence of an $AlBr_3$ catalyst, and because of the activity of this catalyst, conversions are high even at temperatures as low as 80° to 120° F. Pressures of 100 to 200 p.s.i.g. are employed. It has been found that in order to have an effective catalyst, a two phase catalyst system must be employed.

Thus, an important promoter for the reaction is a solid catalyst support, such as calcined bauxite, silica gel, molybdenum oxide, aluminum oxide or mixed oxides, and the like. The reaction is normally carried out by passing a naphtha feed containing $AlBr_3$ in solution over the catalyst support, preferably also in the presence of a cracking inhibitor such as naphthene or isobutane and also of a hydrogen halide promoter such as HBr. The support gradually absorbs $AlBr_3$ from the stream, and the activity rises to equilibrium rates.

The reaction goes rapidly to equilibrium, giving about 92% conversion of n-hexane to isohexane, thus enabling the process to be carried out as a once-through operation. Product is flashed off for distillation, and a bottoms product comprising higher hydrocarbons and usually some $AlBr_3$, both supported and in solution, is recycled to the reaction zone.

Now it has been found that it is important, and indeed vital, that at all times there be maintained in the isomerization zone both aluminum bromide supported on a carrier and likewise aluminum bromide in solution. Supported aluminum bromide is inactive as a catalyst in the absence of dissolved $AlBr_3$. Treating a calcined bauxite support fully saturated with $AlBr_3$, i.e. one containing about 50% by weight of $AlBr_3$, with naphtha free of $AlBr_3$ results in a rapid decline and loss of activity. Thus it is important to maintain in the feed extraneous $AlBr_3$ in solution at all times, and it is to this feature that a preferred use of the apparatus of the present invention is directed. This is shown in FIGURE 2, wherein there is incorporated the monitoring device of the present invention.

Figure 2:
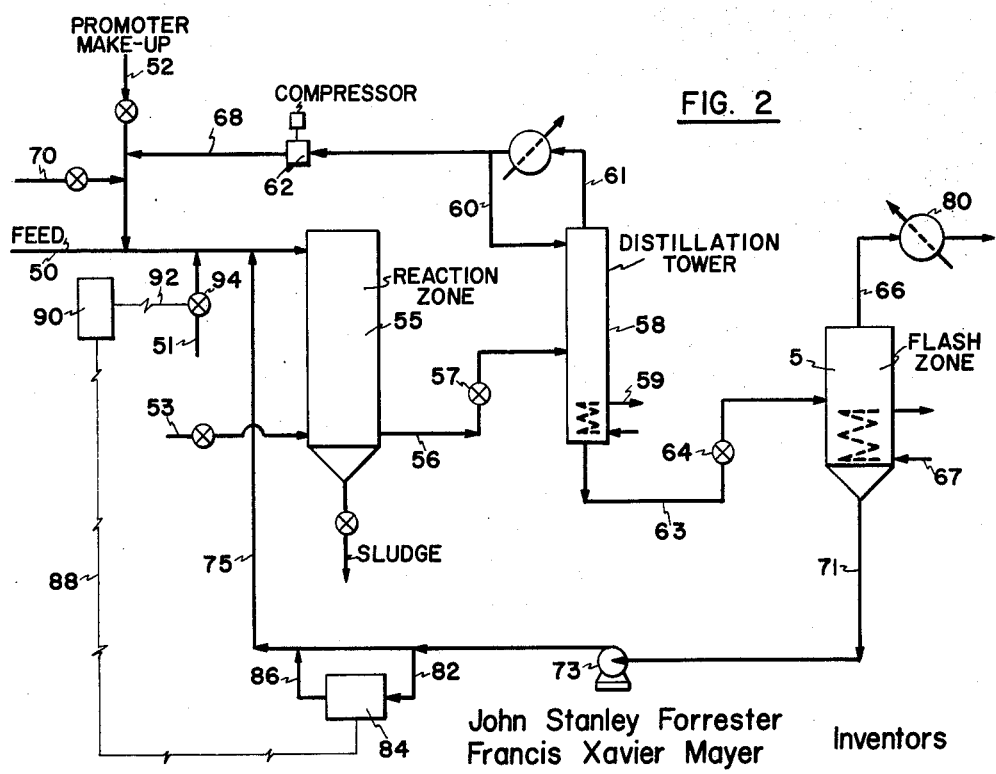
FIGURE 2 represents a flow diagram of an aluminum bromide catalyzed light naphtha isomerization process monitored by the apparatus shown in FIGURE 1.

Referring to FIGURE 2, a feed comprising hydrocarbons is conducted by means of line 50 into a reaction zone 55. The reaction zone may contain a bed of suitable support material for the aluminum bromide, such as alumina, silica, bauxite or the like. When employing a solid support such as alumina or bauxite for the aluminum bromide, the support will adsorb 10 to 80% aluminum bromide based on support weight. The supported aluminum bromide catalyst is formed by introducing dissolved aluminum bromide at 1 to 30 wt. percent concentration in the initial portion of the feed. After formation of the supported catalyst, the amount of aluminum bromide added in the feed may then be reduced to the quantity of $AlBr_3$ that will be converted to sludge in the process by undesirable side reactions. The aluminum bromide make-up may be added by dissolving the $AlBr_3$ in a portion of the hydrocarbon feed to be introduced through line 51. It is essential to keep at all times at least 0.2 to 5.0% $AlBr_3$ in solution in the reaction zone.

Also introduced with the feed is an amount of hydrogen halide promoter sufficient to maintain a positive pressure of hydrogen halide of from 5 to 200 p.s.i.g. in the reaction zone. Initially, this promoter is introduced through line 52 and after the process is under way, the major portion of the halide will be introduced through recycle line 53 while make-up promoter will enter through line 52.

Isobutane is added to the feed in reactor 55 by recovering the isobutane from the product in distillation tower 58 and recycling it through line 68 to enter the reaction zone with the feed stream. Naphthenes may be introduced with the feed or separately through line 70. It is desired to maintain in reaction zone 15 from 2 to 50 volume percent, based on feed to be isomerized, of naphthenes and from 25 to 100 volume percent of isobutane.

The feed is conducted through the reaction zone at rates of the order of 0.05 to 5 v./v./hr. As previously stated, reaction temperatures of from about 50° to 150° F. are employed in reaction zone 55. Preferably, the reaction temperature is in the range of from about 80° to 120° F. for maximum production of highly branched isomers.

The reaction products together with a small amount of dissolved aluminum bromide leave the reaction zone through line 56 and pass to distillation tower 58. If it is desired to effect the distillation at pressures lower than reactor pressure, then the pressure is reduced by valve 57. In the distillation tower the hydrogen halide promoter together with isobutane is removed overhead through line 61. The stream in line 61 is pressured to the pressure level existing in the reactor by means of compressor 62 and recycled to the reaction zone through line 68. Heat for carrying out the distillation operation may be added through line 59. Reflux to the distillation tower may be added through line 60.

The bottoms from the distillation tower pass through line 63 and pressure reduction valve 64 into a flash zone 65. This flash zone may be operated at a pressure of 0 to 50 p.s.i.g. In certain cases it may be desirable to operate the flash zone at low pressure, e.g. 50 to 200 mm. Hg to minimize degradation of the aluminum bromide dissolved in the hydrocarbon. From 50 to 95% of the product is flashed overhead and is conducted by means of line 66 to a condenser 80 and through the necessary pumps to tankage. Heat is added to the flash zone through line 67.

The bottoms in the flash zone 65 will contain aluminum bromide that has been carried out of the reaction zone along with the reaction products due to its solubility in the hydrocarbons. These bottoms are recycled through line 71, pump 73 and recycle line 75 to enter the reaction zone along with fresh feed in line 50. If it is desired to recycle essentially naphthenes with the aluminum bromide, flash zone 65 may be replaced by a distillation tower to concentrate naphthenes in the tower bottoms for recycle along with the aluminum bromide to the reaction zone.

In the above brief description of the process it has been pointed out that dissolved $AlBr_3$ is recycled through lines 71 and 75, and that make-up $AlBr_3$ may be added through line 51. In order to have soluble $AlBr_3$ present at all times in the reaction zone, bleeder line 82 may be positioned in line 75 carrying the recycle catalyst back to the reactor. Consequently a portion of the recycle stream may continuously be withdrawn through line 82 for passage through X-ray analyzer 84, such as that hereinbefore discussed in regard to FIGURE 1, and be returned to line 75 through line 86.

As described, analyzer 84 provides a direct measurement of the halide concentration of this stream. Further, the analyzer is of a suitable nature to provide an electrical signal which may be conducted through the electrical lead 88 proportional in magnitude to the $AlBr_3$ content of the recycle stream. This electrical signal when impressed upon conventional control apparatus 90 may be used to provide a further electrical signal or a pneumatic signal in line 92 operative to control valve 94 in line 51. By this means, operation of valve 94 may automatically be controlled in accordance with the $AlBr_3$ content of the recycle stream in line 71. For example, when the soluble $AlBr_3$ re-entering reactor 55 is above the desired level, based on hydrocarbon therein, the electrical impulses transmitted through lines 88 and 92 are effective in keeping valve 94 closed. Decrease of this amount of $AlBr_3$, or decrease in recycle ratio, will be transmitted to valve 94, which will open to permit flow of sufficient amount of $AlBr_3$ to maintain the reaction within 55 at high conversion levels.

Figure 3:
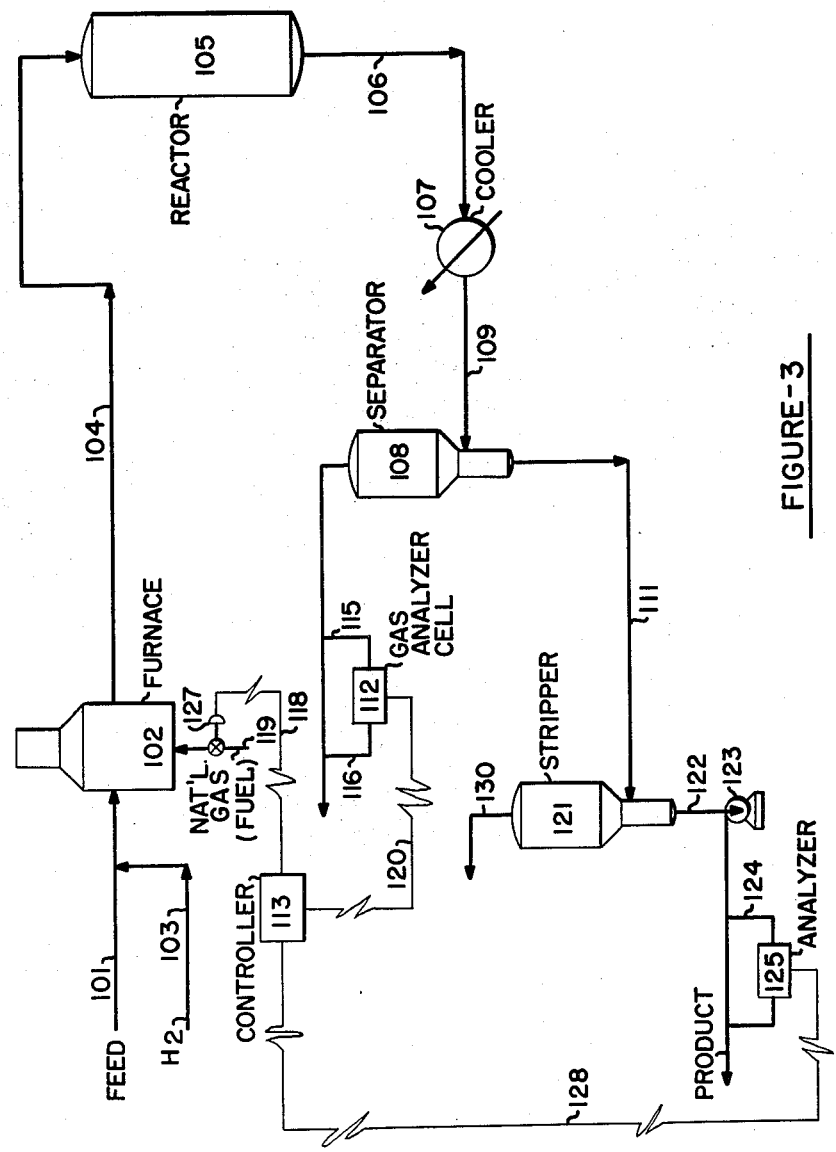
FIGURE 3 represents a flow diagram of a hydrofining process monitored by the apparatus shown in FIGURE 1.

Referring now to FIGURE 3 there is shown a hydrofining process wherein the analyzer discussed hereinbefore is employed to control the hydrofining process. In a hydrofining process the feed, which may be a solvent, kerosene, gas oil residua, lube stocks or other suitable materials, are treated to remove sulfur, improve color, remove nitrogen and reduce aromatic rings. When these hydrofining operations are specific for sulfur removal, it is important in order to follow operations closely to monitor the sulfur content of the liquid product stream. In the process discussed hereinafter the analyzer is used to control the sulfur in the liquid product stream at a specified value.

Feed from a suitable source is directed via line 101 to a furnace 102. Hydrogen may be added to the feed by line 103. In furnace 102 the feed containing hydrogen is preheated to a suitable temperature by the combustion of a fuel, such as natural gas, which enters through line 119. The feed exits furnace 102 via line 104 and is directed to reactor 105 wherein it flows downwardly through a fixed bed of catalyst, which may be cobalt molybdate on alumina or any other suitable hydrofining catalyst. The reactor 105 is maintained at a temperature within the range of about 550° to 800° F. and at a pressure within the range of about 150 to 800 p.s.i.g. The reactor effluent is withdrawn via line 106 and passed to a cooler 107 wherein the temperature is reduced to a temperature in the range of about 150°–250° F. The cooled reactor effluent is passed to a separator 108 by means of line 109. Separator 108 is operated under conditions of 400–600 p.s.i.g. and 150°–250° F.

In separator 108 the unit gas and high pressure liquid are separated, the former being withdrawn via line 110 and the latter by line 111. The high pressure gas is released under pressure control to a fuel gas system or recycled to a scrubber system wherein the $H_2S$ is removed from this gas stream. The gas stream after being freed of $H_2S$ may be recycled back to the reactor 105.

A portion of the $H_2S$ rich gas may be passed through an analyzer 112 wherein the sulfur concentration in the gas is measured. The sulfur concentration in the gas will be related to the sulfur content in the liquid product since by material balance the sulfur content in the liquid may be calculated if the gas composition and its flow rate are known. To determine the sulfur content of the gas a portion of stream 110 is by-passed via lines 115 and 116 through gas analyzer 112, which may be similar in all respects to the apparatus shown in FIGURE 1.

The gas analyzer determines the sulfur content and converts it to an appropriate signal, electrical or pneumatic, which is directed through 120 to control mechanism 113 which regulates the furnace firing rate by controlling through connection 118 the operation of valve 127 on fuel line 119. This has the effect of controlling the reaction temperature which in turn controls the sulfur content of the product from reactor 105.

Alternatively, the liquid product in line 111 may be used to control the furnace firing rate and consequently the sulfur content of the liquid product. The liquid product is passed to a stripper 121 (a low pressure separator) where the remaining traces of H₂S gas are removed. The liquid portion from the bottoms of stripper 121 are removed via line 122 and passed by means of pump 123 to product storage or to use as desired. A portion of this product may be withdrawn via line 124 and directed to analyzer 125 wherein the sulfur content of the liquid product is measured. By the use of a control device similar to that hereinbefore discussed in relation to FIGURE 1 the sulfur content can be converted to electrical or pneumatic signals and these signals may be passed by 128 to a controller 113 to manipulate the firing valve 127 as discussed above. This will thus control the temperature of the reactor to give the desired value of sulfur in a liquid product.

This application is a continuation-in-part of Serial No. 787,846, filed on January 20, 1959, is now abandoned.

This invention is not to be limited by any theory regarding its operation; nor is it to be limited by the specific examples herein presented or the specific embodiments herein described. The scope of the invention is to be determined by the appended claim.

What is claimed is:

An apparatus suitable for monitoring plant streams which comprises:
(1) A corrosion-resistant, substantially cube-shaped, metal cell block of unitary construction,
　(a) Having two intersecting passageways extending therethrough,
　(b) The first of said passageways having a center portion in the form of a truncated cone and being adapted to receive and discharge a continuous flow of fluid;
(2) Upper and lower cylindrical, beryllium windows each having a thickness of 0.2 to 1.0 mm. mounted within the second of said passageways on opposite sides of said first passageway and forming the plane surfaces of said center portion in the form of a truncated cone;
　(a) Said windows being supported by flanges in said second passageway,
　(b) The portion of said second passageway below said windows being of larger cross section than the portion of said passageway above said windows wherein both portions of said second passageway being of larger cross section than said first passageway and both portions of said second passageway are threaded;
(3) Metal threaded means having an inner end with a hollow and having a source of X-ray radiation mounted within said hollow, said threaded means being threadably attached within the portion of said second passageway above said windows and positioned so that said inner end contacts said window and restricts its movement, the depth of the hollow being such that the distance from said radiation source to said first passageway is between ¼ inch to ½ inch;
(4) Solid metal threaded means having a hollow through its entire length within which hollow is a radiation detecting means, said threaded means being threadably attached within the portion of said second passageway below said windows and contacting said lower windows to restrict the movement of said windows in said lower portion of said second passageway.

References Cited in the file of this patent
UNITED STATES PATENTS

| | | |
|---|---|---|
| 2,433,079 | Whiteley et al. | Dec. 23, 1947 |
| 2,487,797 | Friedman et al. | Nov. 15, 1949 |
| 2,706,789 | Hughes | Apr. 19, 1955 |
| 2,974,181 | Findlay | Mar. 7, 1961 |
| 2,978,581 | Wehrli | Apr. 4, 1961 |
| 3,049,617 | Fabian et al. | Aug. 14, 1962 |